United States Patent
Klassen et al.

(10) Patent No.: US 9,026,150 B2
(45) Date of Patent: *May 5, 2015

(54) MOBILE TRACKING

(71) Applicant: BlackBerry Limited, Waterloo (CA)

(72) Inventors: Gerhard Dietrich Klassen, Waterloo (CA); Eric Johnson, Ottawa (CA); Christopher Wormald, Kitchener (CA); Allan Lewis, New Dundee (CA)

(73) Assignee: BlackBerry Limited, Waterloo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/031,171

(22) Filed: Sep. 19, 2013

(65) Prior Publication Data

US 2014/0018104 A1 Jan. 16, 2014

Related U.S. Application Data

(63) Continuation of application No. 11/950,285, filed on Dec. 4, 2007, now Pat. No. 8,554,243.

(51) Int. Cl.
| | |
|---|---|
| *H04W 24/00* | (2009.01) |
| *H04W 4/02* | (2009.01) |
| *G01C 21/20* | (2006.01) |
| *G01C 21/34* | (2006.01) |
| *G01C 21/36* | (2006.01) |
| *G01S 5/00* | (2006.01) |
| *G05D 1/02* | (2006.01) |
| *G08G 1/00* | (2006.01) |
| *H04W 4/04* | (2009.01) |

(52) U.S. Cl.
CPC .............. *H04W 4/025* (2013.01); *H04W 4/046* (2013.01); *G01C 21/20* (2013.01); *G01C 21/3407* (2013.01); *G01C 21/3667* (2013.01); *G01S 5/0072* (2013.01); *G05D 1/0278* (2013.01); *G05D 1/028* (2013.01); *G05D 1/0295* (2013.01); *G05D 2201/0213* (2013.01); *G08G 1/20* (2013.01)

(58) Field of Classification Search
CPC ....... H04W 64/00; H04W 4/023; H04W 4/02; H04W 88/02; H04W 4/046
USPC .......................... 455/456.1–456.4, 456.6, 457
See application file for complete search history.

(56) References Cited

U.S. PATENT DOCUMENTS

| | | | | |
|---|---|---|---|---|
| 8,095,147 | B2 * | 1/2012 | Ahlgren ....................... | 455/456.1 |
| 2003/0100326 | A1 * | 5/2003 | Grube et al. ................... | 455/515 |

(Continued)

*Primary Examiner* — Charles Appiah
*Assistant Examiner* — Jaime Holliday
(74) *Attorney, Agent, or Firm* — Moffat & Co.

(57) ABSTRACT

A method of tracking a first wireless communications device using another computing device, such as a second wireless communications device, includes obtaining current position data for the first wireless communications device and obtaining one or more of speed data, time data, and path data for the first wireless communications device. The first wireless device then transmits the current position data and at least one of the speed data, time data and path data to the second wireless communications device or other computing device. In addition to current position data, the speed, path and time data facilitate tracking of the first wireless communications device. When a first mobile user wants a second mobile user to follow him, the first mobile user can put his device in "follow me" (tracking) mode. This is particularly useful when the first and second mobile users are traveling in respective cars or other vehicles.

12 Claims, 9 Drawing Sheets

(56) References Cited

U.S. PATENT DOCUMENTS

| | | | |
|---|---|---|---|
| 2008/0051104 A1* | 2/2008 | Mohi et al. | 455/456.1 |
| 2008/0133730 A1* | 6/2008 | Park et al. | 709/223 |
| 2008/0146205 A1* | 6/2008 | Aaron | 455/414.2 |

* cited by examiner

MOBILE TRACKING

CROSS-REFERENCE TO RELATED APPLICATIONS

This application is a continuation of application Ser. No. 11/950,285 filed Dec. 4, 2007, the entire disclosure of which is hereby incorporated by reference for all purposes.

TECHNICAL FIELD

The present disclosure relates generally to wireless communications devices and, in particular, to wireless communications devices having Global Positioning System (GPS) receivers or other such positioning-determining capabilities.

BACKGROUND

Some wireless communications devices have Global Positioning System (GPS) chipsets (or external Bluetooth™ accessories) that convert radio-frequency signals received from orbiting GPS satellites into real-time coordinates of longitude and latitude that are typically accurate to within a few meters of the actual current location of the device. The current location (i.e. the coordinates of longitude and latitude) can then be transmitted wirelessly to a recipient who has another wireless communications device (or via cellular base station and Internet to any other networked computing device) to thereby enable the recipient to map the coordinates using any one of a number of available mapping applications such as BlackBerry Maps™, Google Maps or TeleNav™. Transmitting the GPS-determined current location from one mobile device to another enables two mobile users to rendezvous or alternatively enables one mobile user to follow another mobile user. This sort of "consensual" tracking is described, for example, in PCT Publication WO 2006/108071 (X ONE, Inc.) entitled "Location Sharing and Tracking Using Mobile Phones or Other Wireless Devices". In a similar vein are covert GPS tracking devices that are meant to be attached to a target's vehicle without the knowledge and consent of the target. These covert devices provide only static location updates, either automatically (i.e. periodically) or upon remote request. See, for example, U.S. Patent Application Publication 2007/0139223 (Bedenko) entitled "Vehicle Tracking System" and U.S. Patent Application Publication 2007/0099626 (Lawrence et al.) entitled "Tracking System and Method".

Consider the ("consensual") scenario whereby a first mobile user wants a second mobile user to follow him. The first mobile user can periodically send his GPS coordinates to the second mobile user to thus enable the second mobile user to plot the static position data using a mapping application. However, due to the time lag in generating, transmitting and mapping the position data, by the time the second mobile user sees the "current" location of the first mobile user, the location is no longer "current". This is particularly problematic when the second mobile user is following the first mobile user at high speed, such as in their respective cars or other vehicles, in which case the time lag between updates may make it difficult to follow the first mobile user. This problem is further exacerbated in densely populated urban areas where the density of roads makes it less apparent which route or routes need to be taken in order to reach the most recently received location update of the first mobile user. Although one solution might appear to entail more frequent position updates, this would undesirably burden the onboard processors of both the sender's and recipient's devices, not to mention using up valuable wireless bandwidth with the extra over-the-air transmissions. An improvement to this prior-art technology would thus be highly desirable in order to facilitate the tracking of one mobile user by another.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
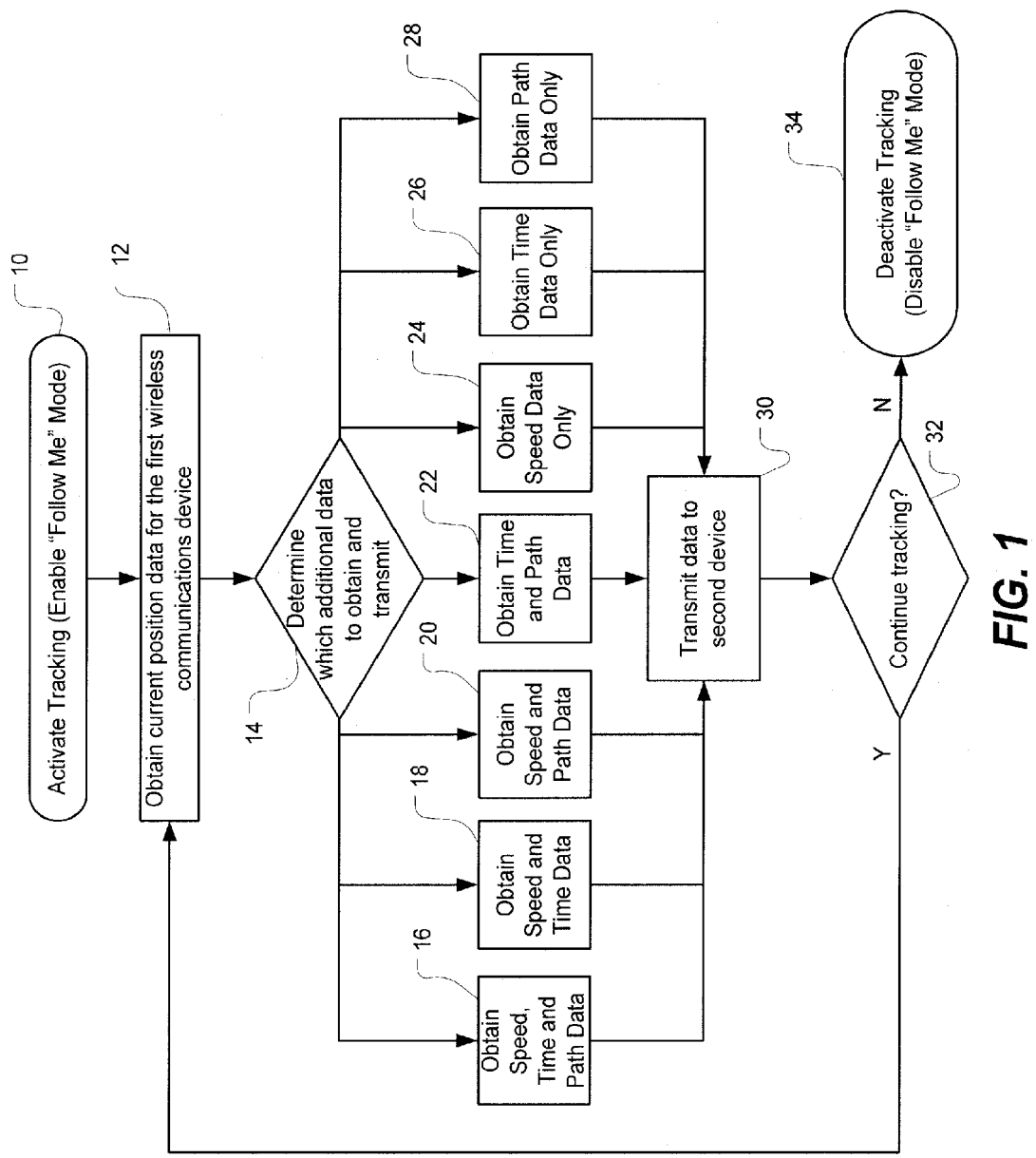
FIG. 1 is a flowchart outlining steps of a method of generating and transmitting speed, time and path data to enable a first wireless communications device to track a second wireless communications device.

The present technology generally provides a method, wireless communications device and computer program product that enable tracking of a wireless communications device. In its primary application, this technology enables a user of a first wireless communications device to track or follow a second wireless communications device by receiving not only current position data representing the current position of the second device, but also one or more of speed data, time data or path data indicative, respectively, of the speed of the device, the time corresponding to the current position, and the path (or route) that the device has taken from its previously transmitted position to its current position.

Accordingly, an aspect of the present technology is a method of tracking a wireless communications device using another computing device. The method includes steps of obtaining current position data for the first wireless communications device, obtaining one or more of speed data, time data, and path data for the first wireless communications device, and transmitting the current position data and at least one of the speed data, time and path data from the wireless communications device to the other computing device to enable tracking of the wireless communications device using the computing device. In a main implementation, the computing device is a second wireless communications device so that a first wireless communications device is used to track a second wireless communications device.

Another aspect of the present technology is a computer program product that includes code adapted to perform the steps of the foregoing method when the computer program product is loaded into memory and executed on a processor of a wireless communications device. Alternatively, the code could be loaded onto a server that is adapted to receive the raw device data from the first mobile device, process the data to create useful route-tracking information, e.g. waypoints, and then transmit the information (processed data) to the second mobile device.

Yet another aspect of the present technology is a wireless communications device for generating and transmitting data to enable tracking of the device. The device has a GPS chipset for receiving GPS signals and for generating current position data representing a current position of the device, a memory operatively connected to a processor for storing and executing an application configured to obtain one or more of speed data, time data and path data for the device, and a radiofrequency transmitter for transmitting the current position data in addition to at least one of the speed data, the time data and the path data.

Yet a further aspect of the present technology is a computing device for tracking a mobile device. The computing device has a communications port for receiving current position data representing a current position of the mobile device in addition to at least one of speed data, time data and path data associated with the mobile device, a memory operatively connected to a processor for storing and executing a mapping application for generating a map on which the current position is mapped, and a display for displaying the map in addition to the one or more of the speed data, the time data, and the path data.

The details and particulars of these aspects of the technology will now be described below, by way of example, with reference to the attached drawings.

FIG. 1 is a flowchart outlining steps of a method of generating and transmitting speed, time and path data to enable a first wireless communications device to track a second wireless communications device. In an initial step 10, tracking of one device by another is initiated. This will be known herein as enabling or activating "follow-me" mode. Activating "follow-me" mode may be done by either the first device or by the second device, and it may be done either manually or automatically. Automatic triggering of tracking mode can be done using a proximity detection subsystem that detects when one device has strayed away from another device with which it has been paired. Bluetooth™ proximity detection can be used to accomplish this. When one Bluetooth™ device strays away from its paired device, then connectivity is lost, which can thus be used to automatically trigger the activation of tracking/follow-me mode.

As depicted in the flowchart in FIG. 1, once tracking/follow-me mode has been activated, the first wireless communications device (the "lead" device, i.e. the mobile device that is to be followed) obtains, at step 12, current position data representing the current position (location) of the device. Current position data can be obtained using an onboard GPS chipset receiver or an external Bluetooth™-enabled GPS puck. GPS signals from multiple orbiting GPS satellites provide a position fix accurate to within a few meters. Assisted GPS technologies and Aided GPS technologies can also be used to increase the time-to-first-fix (TIFF). Position data can also be obtained or supplemented using by radiolocation techniques involving triangulation of base station signals and time of arrival calculations, though these techniques are less accurate than GPS, which provides sufficient accuracy for road-based navigation.

As further depicted in FIG. 1, the method also entails a step 14 of determining which additional data types to obtain and transmit. In other words, in addition to generating and transmitting current position data, one or more of speed data, time data and path data is obtained and transmitted as well. As shown in FIG. 1, seven options (16-28) are presented in FIG. 1: option 16: obtaining all data types (i.e. speed, time and path data); option 18: obtaining only speed and time data; option 20: obtaining only speed and path data; option 22: obtaining only time and path data; option 24: obtaining only speed data; option 26: obtaining only time data; and option 28: obtaining only path data. In other words, the "tracking data" includes not only GPS position data but also one or more of the speed data, time data and path data. The tracking data can also include bearing (direction of travel). Once this "tracking data" has been obtained, it is transmitted at step 30 to the other device (i.e. the device that is following/tracking the lead device). For consistency of nomenclature, the first mobile user will be operator of the lead device whereas the second mobile user will be the operator of the tracking/following device. After the tracking data has been transmitted, an assessment is made as to whether to continue tracking at step 32. If no further tracking is desired (i.e. if either the first mobile user or the second mobile user has disabled the tracking function), then operations cease at step 34. If further tracking is to be continued, then new (updated) position, speed, time and path data is obtained and transmitted by repeating steps 12-30. The characteristics and attributes of the speed, time and path data will be elaborated in greater detail below with regard to FIG. 3. As will be explained below, this additional tracking data facilitates the task of tracking or following another mobile device. Due to the time lag between static current position data points, it is sometimes very difficult to determine which route to take to follow the lead device. Providing speed, time and path data in addition to current position data provides the second mobile user (i.e. the follower or tracking party) a better overall picture of the movements of the first mobile user. This makes it much easier for the second mobile user to not only retrace the first mobile user's exact route, but also to (possibly) predict or anticipate where the second mobile device is headed.

The foregoing method steps can be implemented as coded instructions in a computer program product. In other words, the computer program product is a computer-readable medium upon which software code is recorded to perform the foregoing steps when the computer program product is loaded into memory and executed on the microprocessor of the wireless communications device.

This novel method is preferably implemented on a wireless communications device such as the BlackBerry® by Research in Motion Limited (or on other wireless handhelds, cellular phones, wireless-enabled laptops or wireless-enabled PDAs).

Figure 2:
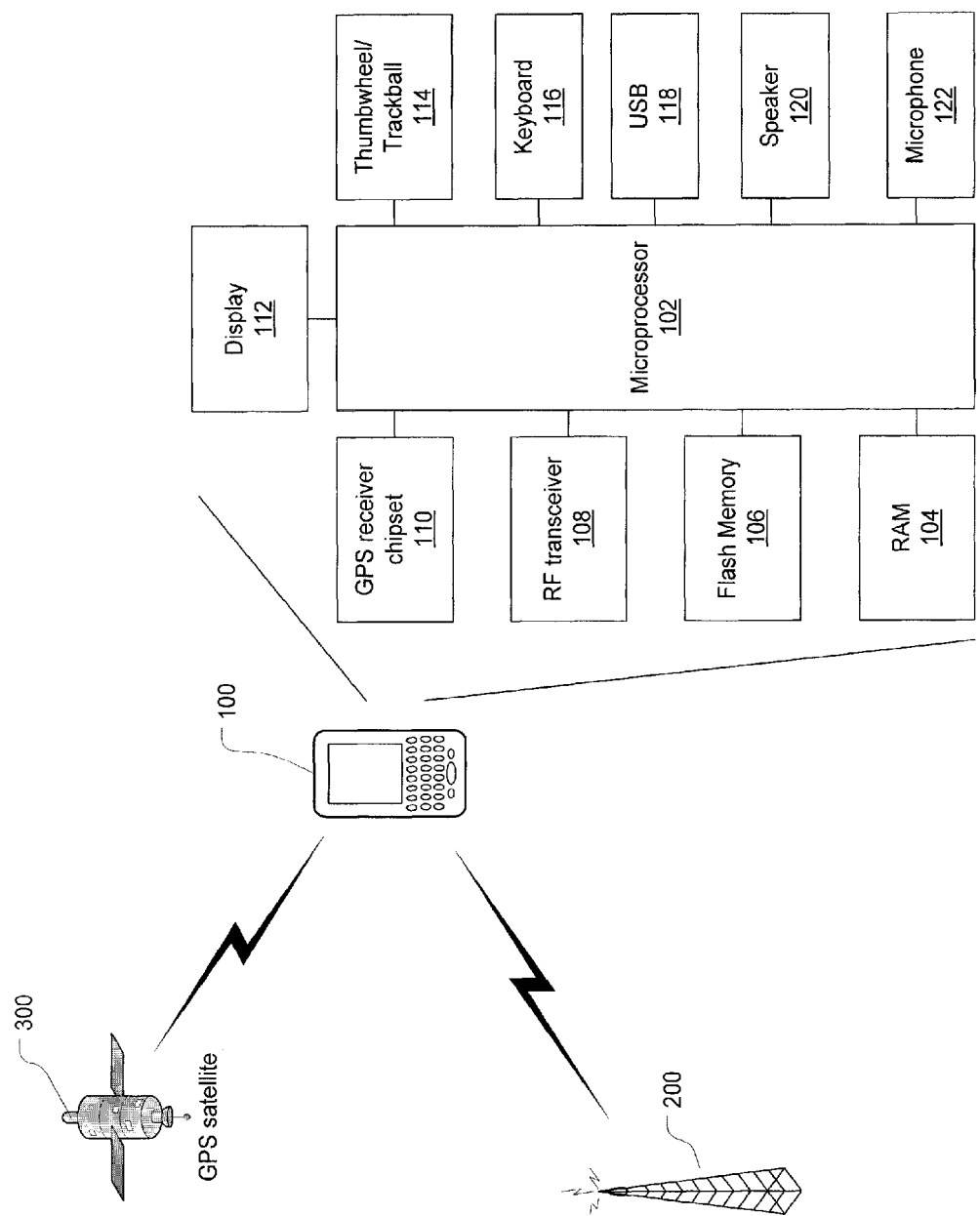
FIG. 2 is a block diagram of key components of a GPS-enabled wireless communications device on which the present technology can be implemented.

FIG. 2 is a block diagram depicting certain key components of a wireless communications device 100. It should be expressly understood that this figures is intentionally simplified to show only certain components; the device 100 of course includes other components beyond what are shown in FIG. 2. The device 100 includes a microprocessor 102 (or simply a "processor") which interacts with memory in the form of RAM 104 and flash memory 106, as is well known in the art. The device 100 includes an RF transceiver 108 for communicating wirelessly with one or more base stations 200. The device 100 includes a GPS receiver chipset 110 for receiving GPS radio signals transmitted from one or more orbiting GPS satellites 300. In terms of input/output devices or user interfaces, the device 100 typically includes a display 112 (e.g. a small LCD screen), a thumbwheel and/or trackball 114, a keyboard 116, a USB 118 or serial port for connecting to peripheral equipment, a speaker 120 and a microphone 122. The processor and memory thus enable a map application (among other software applications) to run on the wireless device. The map application can interact with the GPS receiver 110 by mapping GPS position coordinates so as to graphically display the current location of a device.

Figure 3:
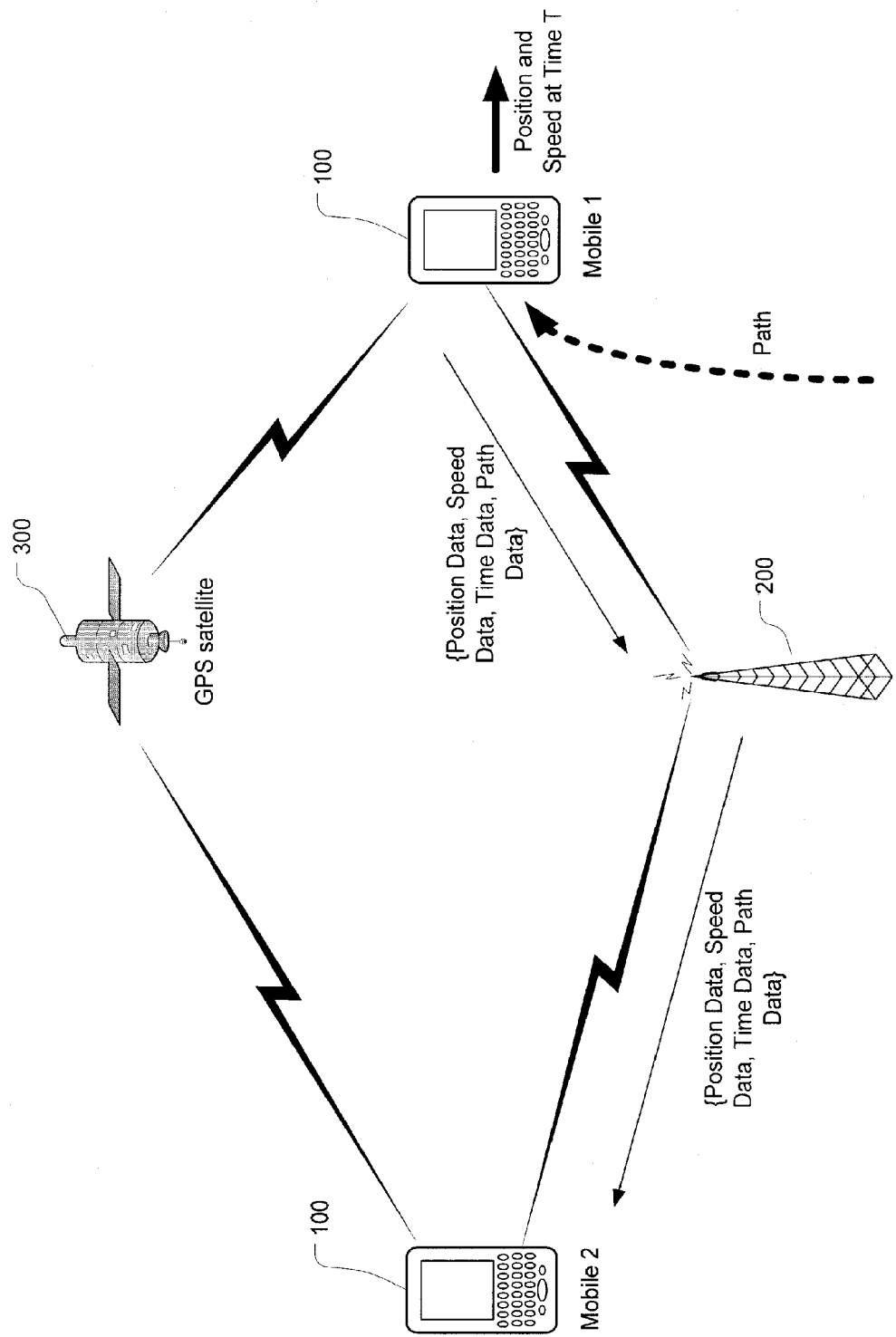
FIG. 3 is a high-level system diagram depicting operation of the present tracking technology.

FIG. 3 is a high-level system diagram depicting operation of the present tracking technology. In this diagram, two GPS-enabled wireless communications devices 100 are in communication with each via base station 200 or via separate base stations if the devices are further apart. In any event, the devices are connected to each other via a wireless network enabling transmission and reception of data packets. In addition, as shown in FIG. 3, the wireless communications devices 100 are in receipt of GPS signals from a plurality of GPS satellites 300. The lead device "Mobile 1" (which is associated with the first mobile user) obtains and transmits current position data, speed data, time data and path data (or a subset thereof) to the device of the second mobile user ("Mobile 2") via base station 200 (and its wireless network). Mobile 2 receives this current position data, speed data, time data and path data (or a subset thereof) and then presents this "tracking data" to the second mobile user graphically and/or audibly.

For example, the second wireless communications device can map the current position and path with superimposed speed and time information of the first mobile user on a map, as will be shown by way of example below in FIG. 7. Alternatively or additionally, the tracking data can be presented audibly such as in the form of audible reports (e.g. "The party you are following was 2 minutes ago at the corner of 1$^{st}$ Avenue and Bank Street, traveling eastbound on 1$^{st}$ Avenue at 50 km/h") and/or as turn-by-turn instructions to navigate the same path as taken by the first mobile user. In addition to receiving the tracking data, the second mobile device receives its own GPS signals and converts these into its own GPS fix. Its own current position can be plotted on the map to show relative positions. Alternatively or additionally, its own current position fix can be used by navigation software to reroute the second mobile user over a different path to catch up to the first mobile user. In other words, navigation software can be used to determine a more optimal route to reach the most recently received current position of the first mobile user and to present this option to the second mobile user, who may either choose to follow the exact path taken by the first mobile user or to take the suggested, "more optimal" route to catch up to the first mobile user.

For the purposes of this specification, "speed data" means data pertaining to the speed, velocity or rate of travel of the device being followed. The speed data can be an average speed determined using the rate of change of (GPS-determined) position over time. Alternatively, speed data can be an instantaneous velocity obtained using a velocity sensor/transducer that is embedded or connected to the device. As a further alternative, the device may receive speed data wirelessly (e.g. via Bluetooth™ from a vehicle speed sensor). The speed data may include the speed as a scalar value (just the magnitude) or it may include a velocity vector (both speed and direction). Where path data is also provided, the velocity vector is unnecessary since direction is already known from the path data). Speed data is useful to the recipient (second mobile user) to know how fast the first mobile user is travelling, and thus whether he should consider traveling faster to catch up.

For the purposes of this specification, "time data" means data pertaining to the actual time of day of the first mobile device when it is at a particular location or the time elapsed since the last position fix or the time elapsed between the position fix and the receipt of the tracking data by the second mobile user. In other words, time data accompanying the GPS position fix gives important context to the location data by telling the recipient (the second mobile user) that the first mobile user was at that particular location at that particular time. Merely providing the location is not nearly as informative since the recipient might not have a good sense as to exactly when the first mobile user was at that location. In other words, time data enables the recipient to know how old or stale the position fix really is.

For the purposes of this specification, "path data" means data pertaining to the path or route that the first mobile device has taken. This can be provided as path segments (just the portion of the path that the device has travelled since the previously fix was obtained) or as a cumulative path that shows the entire path the device has travelled since tracking was initiated. Alternatively, the receiving device can store all the path data but only display the cumulative path data that fits within the bounding box of at the map scale selected. The path data may include a sequential list of all street names and highway numbers that define the path taken by the lead device along with the direction taken along each one, thus constituting navigation instructions for the recipient. Alternatively, the path data can be vector data that enables the recipient device to render a map of the path with the path highlighted using one of any number of standard mapping applications. Alternatively, a bitmap showing the route/path highlighted can be generated by the lead device and transmitted to the recipient device for immediate viewing onscreen. Optionally, the efficiency of this tracking method or following method can be improved by simplifying the path data to reduce the amount of data being generated and transmitted without unduly sacrificing travel path fidelity. Techniques such as the Douglas Peuker line simplification algorithm can be used to reduce the number of points required to describe a path (e.g. by eliminating common points along a straight line).

As will appreciated, the path data effectively subsumes the current position data because the destination point of each path segment of the path data corresponds to each of the position fixes. The path data is presented as a graphically highlighted route on a map (with optional navigation instructions presented either graphically or audibly). The current position fix is thus used to define the endpoint or destination of the path. The second mobile device (the following device) may optionally present the destination of the path (which is defined by the GPS position fix) either as a destination street address (e.g. 123 Main Street) and/or as longitude and latitude coordinates.

In another implementation, the second mobile device could also optionally present a distance to the first mobile device. This distance could be in terms of actual road distance in kilometers (or miles) or meters (or yards). The distance could alternatively be presented in terms of straight-line distance (the distance "as a crow flies") along with the compass bearing (e.g. "northeast" or 045 degrees). In addition to, or in lieu of, distance, an estimated time ("estimated time of arrival") to the current location of the first mobile user can be provided or the time to convergence can be presented (the time required to catch up to the first mobile user or to arrive within a prescribed range of the first user, such as, for example, the range at which the Bluetooth™ proximity detection was triggered). Thus, in this variant of the implementation, a "trip computer" module can be provided as a software application on the device to compute various distances, compass bearings and times.

Figure 4:
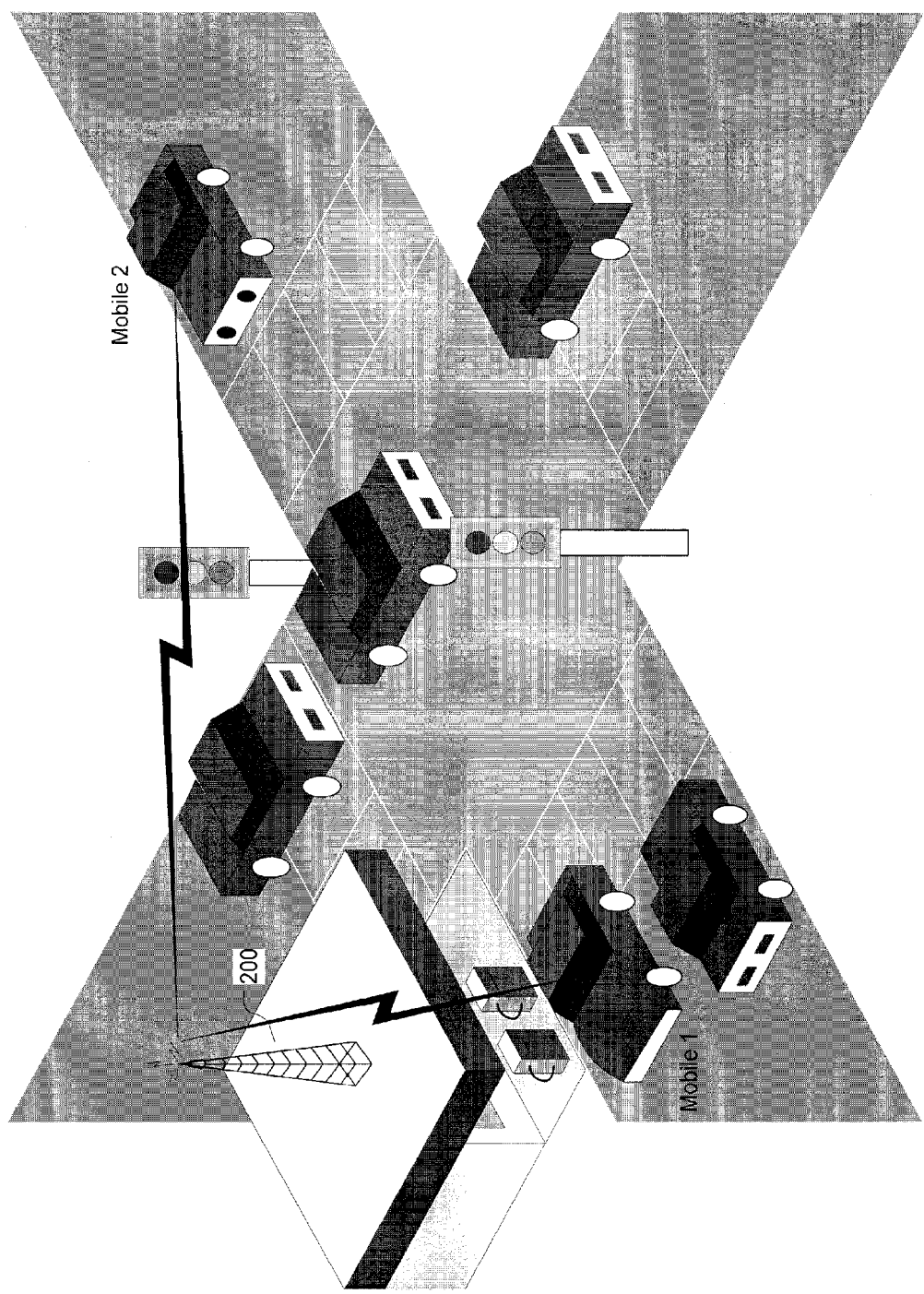
FIG. 4 depicts a common scenario, which is presented merely by way of example, in which a first mobile user would utilize the present tracking technology to enable a second mobile user, who has been left behind at a traffic light, to follow the first mobile user.

FIG. 4 depicts a common scenario, which is presented merely by way of example, in which a first mobile user ("Mobile 1") would utilize the present tracking technology to enable a second mobile user ("Mobile 2"), who has been left behind at a traffic light, to follow the first mobile user. The present technology is particularly useful for mobile users travelling in road vehicles where the speeds involved, the volume of traffic on the roads, the interference of traffic lights, and the number of routing options make it is easy to lose track of the vehicle being followed. Although cars are depicted by way of example, the scenario described with regard to this and the following figures is equally applicable to other road vehicles (e.g. trucks, vans, buses, motorcycles, scooters), or to off-road vehicles (e.g. snowmobiles, ATVs), or to watercraft (e.g. motorboats, yachts, sailboats, personal watercraft, jet skis) or to bicyclists or even to mobile users who are merely walking on foot.

Figure 5:
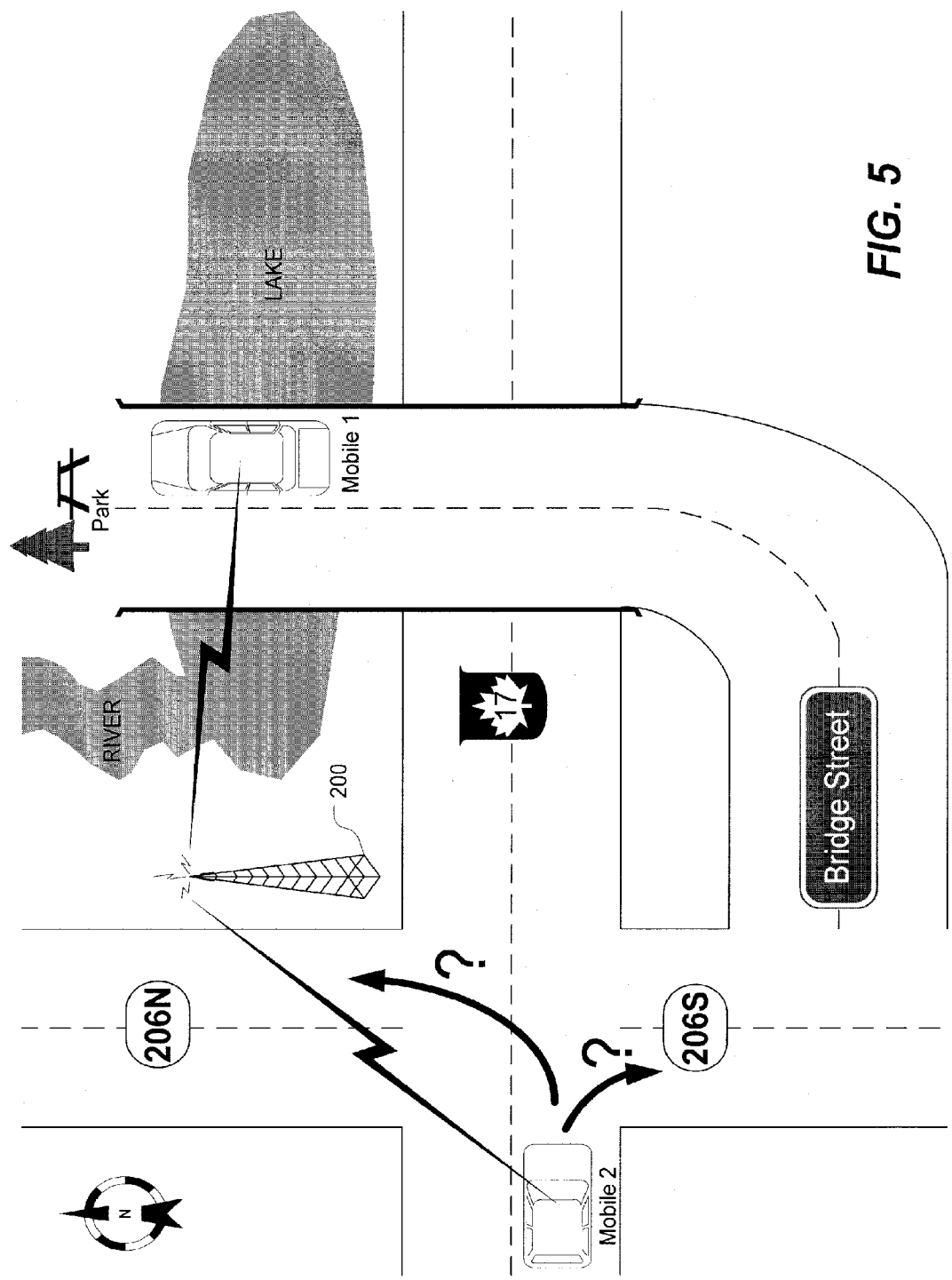
FIG. 5 depicts the problem, arising out of the example scenario of FIG. 4, in which the second mobile user is left trying to guess which is the proper route to take to follow the first mobile user when only current location updates are provided periodically to the second mobile user.

FIG. 5 depicts the problem, arising out of the example scenario of FIG. 4, in which the second mobile user ("Mobile 2") is left trying to guess which is the proper route to take to follow the first mobile user ("Mobile 1") when only current location updates are provided periodically to the second mobile user. In this example scenario, the car associated with Mobile 1 is no longer within visual range of the car associated with Mobile 2 (having been left behind earlier on at a traffic light). Therefore, the occupants of the car associated with Mobile 2 would not necessarily know which way to go (presuming, for the sake of illustration, that the occupants of the car associated with Mobile 2 do not know the proper route to take to reach the park by the lake).

Figure 6:
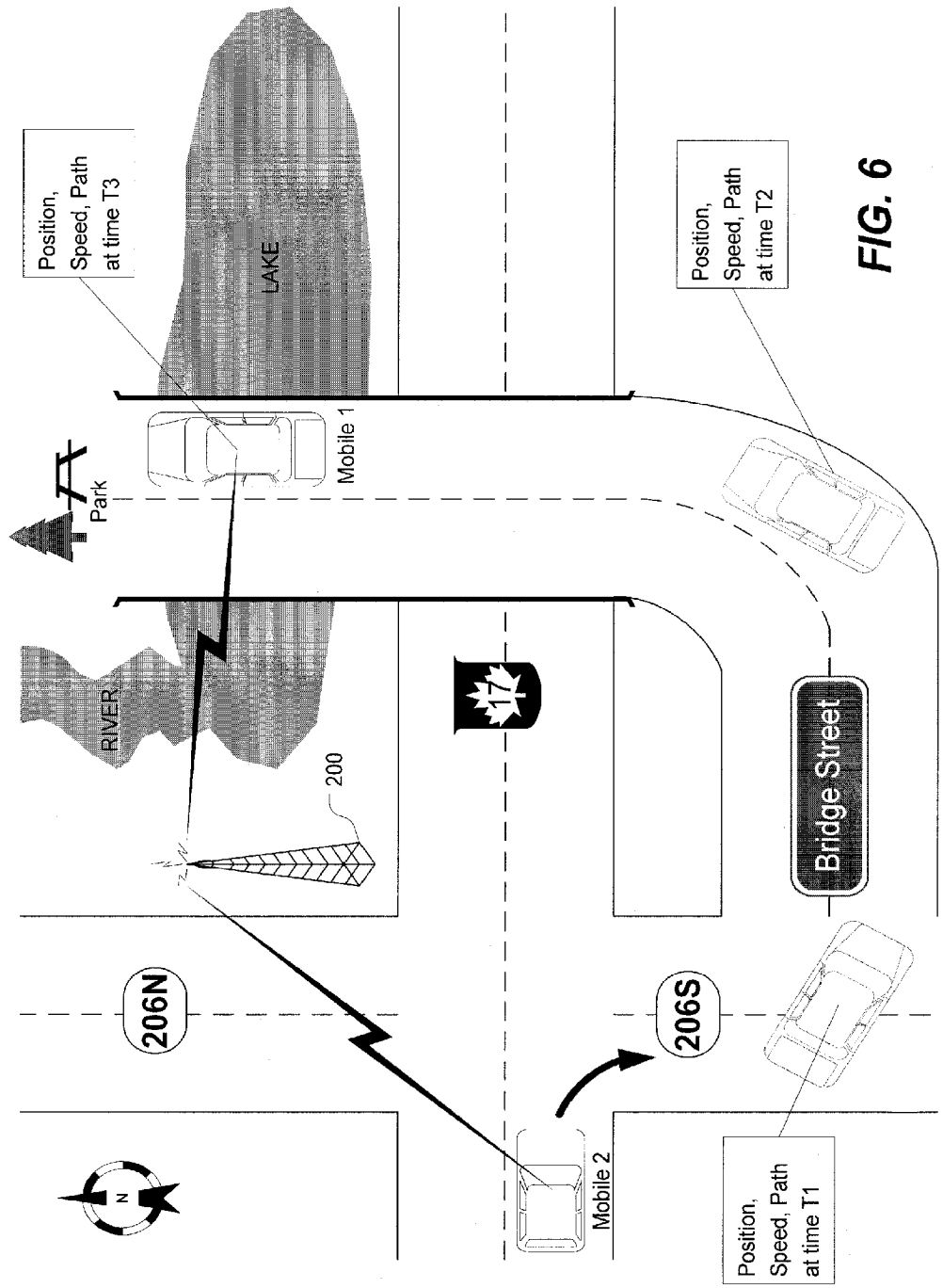
FIG. 6 depicts how a method of generating and transmitting speed, time and path data enables the second mobile user to determine the proper route to the first mobile user.

FIG. 6 depicts how a method of generating and transmitting speed, time and path data enables the second mobile user ("Mobile 2") to determine the proper route to the first mobile user "Mobile 1"). In this example, which is again merely provided to illustrate the use of the present technology, three data transmissions are provided by Mobile 1 to Mobile 2 at discrete points to enable Mobile 2 to follow Mobile 1. At time T1, when Mobile 1 turns off Highway 206 South (206S) onto Bridge Street, Mobile 1 transmits its current position as well as its speed, time and path to Mobile 2. The path data, for example, might be a pre-generated bitmap (or vector path data enabling rendering of a map) showing a segment of Highway 17 followed by an exit onto Highway 206S. Turn-by-turn navigation instructions in graphical or audible form could also be provided. At time T2, when Mobile 1 turns onto the bridge, another transmission of tracking data is sent, again providing an update of the current position of Mobile 1 along with its updated speed, time and path. Again, at time T3, Mobile 1 transmits updated position, speed, time and path data to Mobile 2. The three data transmissions provide Mobile 2 with enough information to enable Mobile 2 to correctly exit onto Highway 206S, to correctly turn onto Bridge Street and to correctly follow the bridge over the lake to the park which is the destination that Mobile 1 intended.

Figure 7:
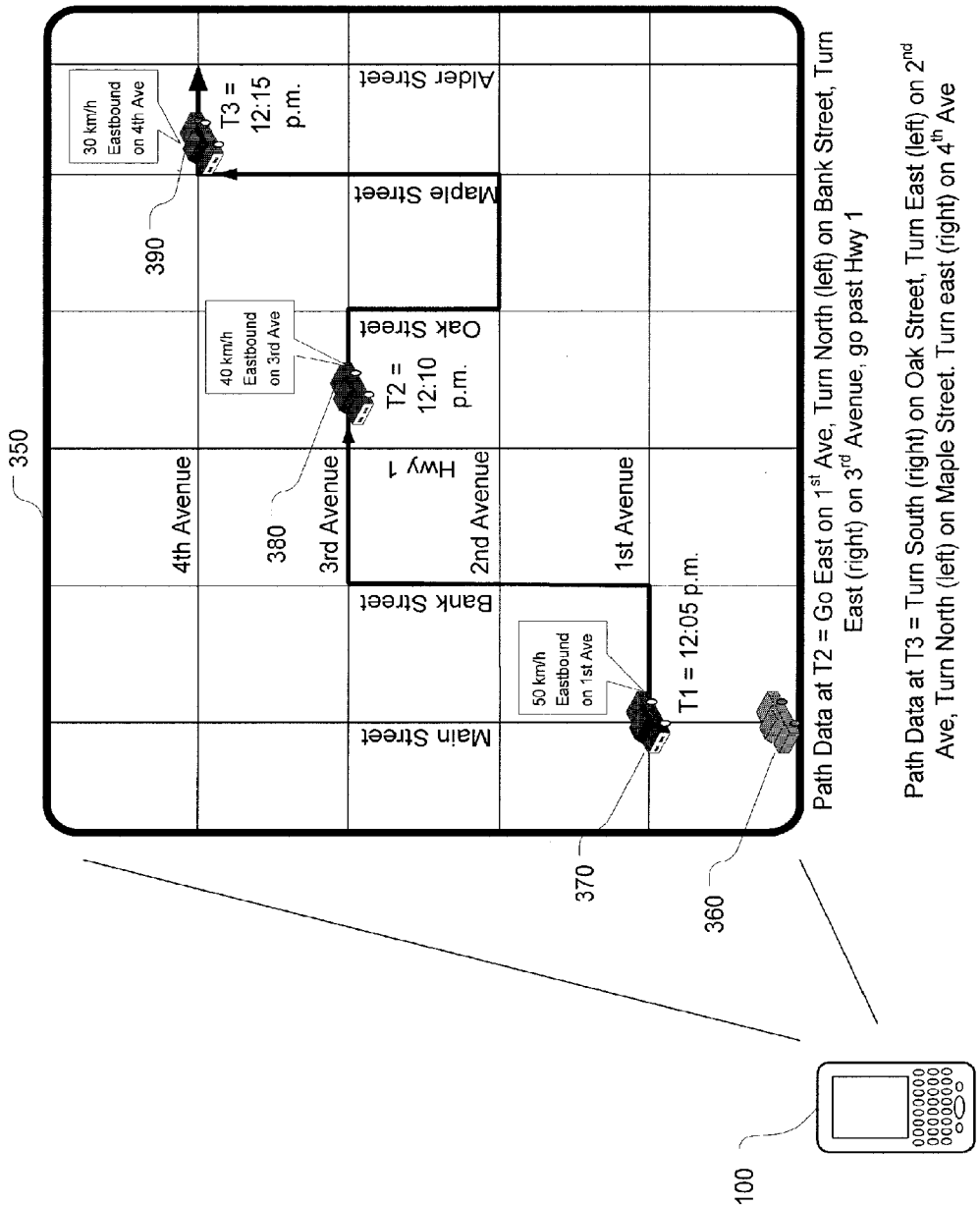
FIG. 7 depicts an example of a map application displayed on a wireless communications device of a mobile user who is tracking another mobile user.

FIG. 7 depicts an example of a map application displayed on a wireless communications device of a mobile user who is tracking another mobile user. An application interface 350 is provided merely by way of example to illustrate one manner of presenting the tracking data. As will be readily appreciated, other interfaces presenting the data in other manners, i.e. having a different "look and feel" would be of course be possible. Likewise, the interface could present more data or less data than what is shown in this example. In addition to the graphical representation of the tracking data, audible reports can be used to supplement or replace certain aspects of the tracking data, e.g. using text-to-speech turn-by-turn navigation that read aloud the street names, audibly reporting speed, time and position data in addition to displaying it onscreen.

As depicted on the example interface 350 shown in FIG. 7, the current location of the tracking party (the second mobile user) is shown by a car icon 360 (although other icons can be selected by the user to fit the circumstance). Car icon 370 represents the GPS position fix at time T1 of the first mobile user that the second mobile user is tracking as soon as tracking/follow-me mode is initiated. The first set of tracking data packets is transmitted to the second mobile user to report that, for example, at time T1=12:05 pm, the first mobile user was traveling at a speed of 50 km/h eastbound on $1^{st}$ Avenue. A short while later, a second transmission is sent to update the current position, speed, time and path. Car icon 380 represents the updated position at time T2 which, in this example, is five minutes later at 12:10 pm (although it should be appreciated that updates can be provided more frequently, e.g. once per minute) or less frequently, as configured by the users. Less frequent updates can be provided in rural environments where the routing options are fewer and where the users desire to conserve device resources for other uses or applications. More frequent updates would of course be useful in densely populated urban areas where the number of route choices are high and thus the likely of getting lost is higher. The frequency of updates can also be managed or modulated based on the state of the leading user (first mobile user) and the distance between the first mobile user and the second mobile user (the following party). For example, updates may be sent less frequently if the lead user (first mobile user) is (a) stopped; (b) travelling at high speed in a constant direction; or (c) a large distance from the following vehicle (which require feedback from the tracking party/second mobile user). Sending updates less frequently reduces the burden on the mobile devices and on the wireless link. It should also be noted that path data can be more easily compressed if it is sent in larger segments. The rate of travel (i.e. speed) of the lead user (first mobile user) can also be an important factor in determining whether there is a latency effect in the process of generating, transmitting, receiving and displaying the path data. In other words, if there is a significant or noticeable delay ("latency") in providing the path data to the tracking party, then the method should take this latency or delay into account by anticipating or predicting where the first mobile user (lead user) is likely to be, or where the lead user is heading, at the time the path data is actually displayed onscreen on the device of the second mobile user.

Referring still to the example of FIG. 7, the second data transmission reports that, for example, at time T2=12:10 pm, the second mobile user was traveling 40 km/h eastbound on $3^{rd}$ Avenue. The path data would provide a route as shown between car icons 370 and 380, i.e. the route traversed between times T1 and T2. Written instructions and/or audible instructions would provide turn-by-turn navigation, e.g. "Go East on 1st Ave, Turn North (left) on Bank Street, Turn East (right) on 3rd Avenue, go past Hwy 1."

Still referring to the example presented in FIG. 7, a third update is provided to the second mobile user by transmitting updated tracking data at time T3, whose position is represented by car icon 390. At time T3=12:15 pm, which is again five minutes later, the first mobile user is traveling 30 km/h eastbound on 4th Avenue. The path data would update the route as shown between car icons 380 and 390 and would optionally also provide navigation instructions in written or audible format, e.g. "Turn South (right) on Oak Street, Turn East (left) on 2nd Ave, Turn North (left) on Maple Street. Turn east (right) on 4th Ave." The path, speed and time data facilitate the second mobile user's task of following the first mobile user through the city streets. As mentioned earlier, the application may optionally compute an alternate route (e.g. east on 1st Avenue and left on Alder) rather than slavishly follow the exact path taken by the first mobile user. In any event, the second mobile user may be presented with a choice between the exact route and the alternate route or the user may configure the device to automatically provide either the exact route or the alternate route (where the alternate route is shorter).

Figure 8:
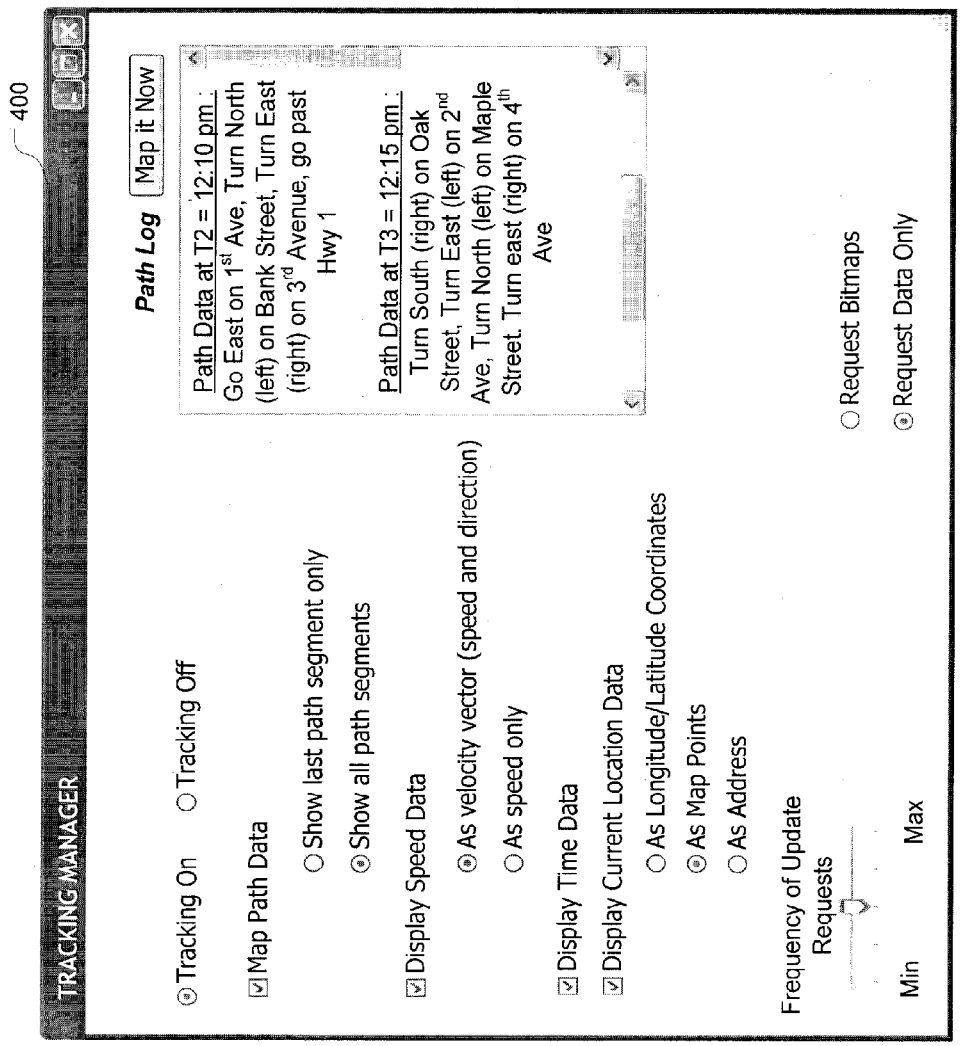
FIG. 8 depicts an example of an options page within a "Tracking Manager" module or application in which the user of the tracking device can configure various settings and preferences associated with the tracking function.

FIG. 8 depicts an example of an options page 400 within a "Tracking Manager" module or application in which the user of the tracking device (the second mobile user) can configure various settings and preferences associated with the tracking function. For example, the options page 400 enables the user to activate or deactivate the tracking function, to determine which types of data are to be displayed and in what particular format. The user can also specify the frequency with which updates requests are sent to the device belonging to the first mobile user being followed. The user can also specify whether he prefers to receive pre-generated bitmaps (i.e. bitmaps generated by the first mobile user on his device) or to receive the raw data which is then to be mapped by the receiving device. An optional path log can be provided to enable the user to review or revisit all of the navigation instructions acquired while following the first mobile user along the various path segments. An optional "Map It Now" function will bring up a map with the paths highlighted or otherwise emphasized.

In one implementation, a breadcrumb path (composed of waypoints or path segments) can also be stored (along with optional reverse navigation instructions) to enable the user to retrace his path to return to the starting point where the following began. This breadcrumb function and/or set of reverse path instructions is particularly useful in situations when the second mobile user has followed the first mobile user through unfamiliar places and then wishes to return alone (unguided) to the point of where the following originated. For example, consider the scenario where the second mobile user has followed the first mobile user to a cottage through unfamiliar terrain and then wishes to return home alone after dark. The user activates the breadcrumb function to obtain the route home without having to worry about trying to navigate unfamiliar roads in the dark. The breadcrumb function can also include stored travel times to inform the user of how much time it took to travel between the waypoints when following the first mobile user. The breadcrumb function can also optionally provide distances (audibly or graphically) and travel speeds for each path segment between waypoints. This is useful for the user to know what speed is reasonable to travel (when perhaps speed limits are not easily visible) and how many kilometers or miles he has to travel to the next waypoint. The breadcrumb function can also optionally re-compute the travel time to the next waypoint based on the actual travel speed on the return leg of the voyage (which may happen to differ from the travel speed for the first leg of the voyage). In addition to turn-by-turn retracing of steps, another breadcrumb function that can be implemented is an off-road breadcrumb function which is usable in scenarios where the lead user (first mobile user) is not traveling on roads known to the navigation software, in which case breadcrumbs or waypoints are defined at specific positions to enable the tracking party to follow the same path or paths taken by the lead user. For example, this would be useful for off-road vehicles, all-terrain vehicles, watercraft, boats, aircraft, helicopters, or pedestrians or hikers who wish to follow the lead user but without reference to specific defined roadways.

In a variant on this implementation, the device can be configured to record audible input from the user (via the microphone on the device) that thereby enables the user to comment on personally defined waypoints. This recorded waypoint commentary can be stored in association with an actual GPS position fix (or an interpolated position between adjacent fixes based on travel time and travel speed). When the user retraces his route, the waypoint commentary is played audibly via the device speaker to remind the user of landmarks or waypoints that are personally meaningful. For example, when passing a particular gas station, the user may record "We are turning at a bright orange gas station by a McDonald's." Recording may be voice-activated (hands-free) or triggered by saying a predetermined specific word or phrase like "Record Waypoint Comment" that voice-recognition software on the device recognizes. When the user returns, the waypoint comment is played through the speaker to alert the user of the particular waypoint that he considered meaningful.

Figure 9:
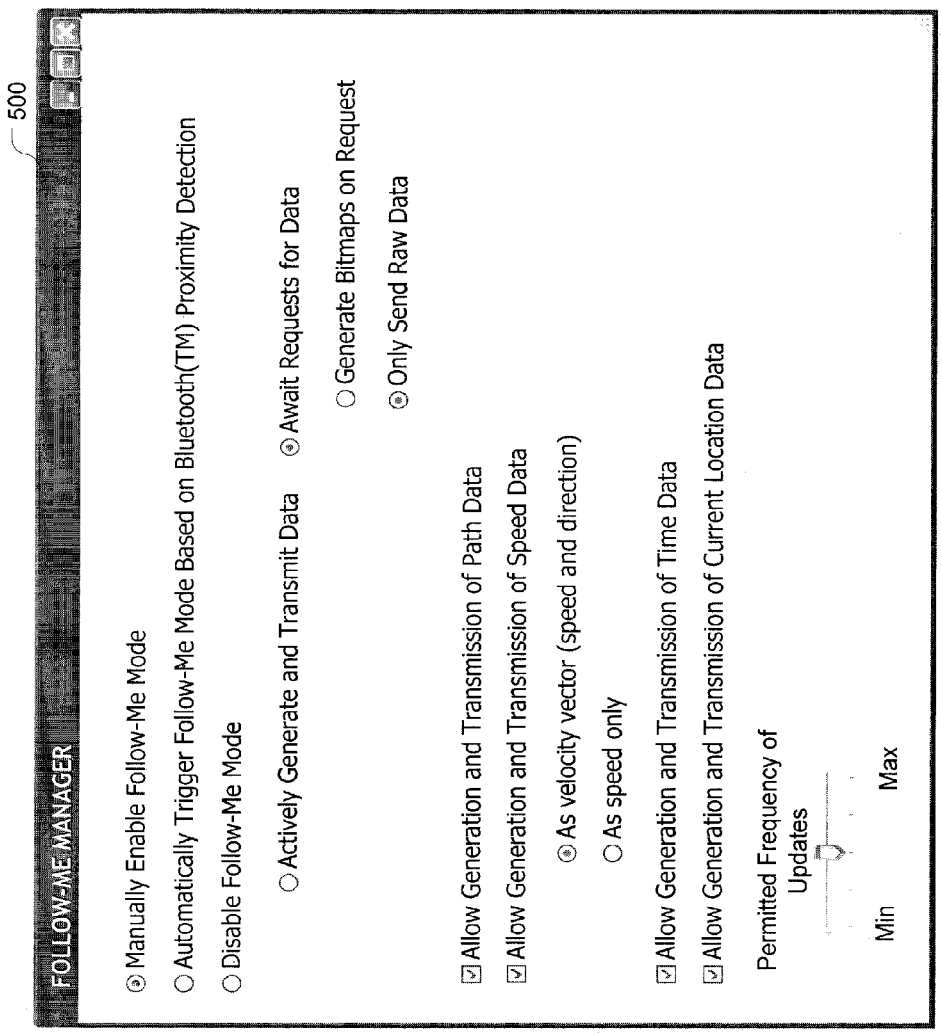
FIG. 9 depicts an example of an options page within a "Follow-Me Manager" module or application in which the user of the device to be followed can configure various settings and preferences associated with the tracking function.

FIG. 9 depicts an example of an options page 500 within a "Follow-Me Manager" module or application in which the user of the device to be followed can configure various settings and preferences associated with the tracking function. The follow-me manager enables the user of the device being followed (the first mobile user) to manually enable the follow-me mode, to automatically trigger the follow-me mode based on Bluetooth™ proximity detection (loss of Bluetooth™ connectivity), or to disable follow-me mode (to refuse to receive tracking data). There could be other options too, for example, to buffer the tracking data and to ask the second mobile user whether he would like to accept the tracking data and if the second device replies in the affirmative, then the first device enters follow-me mode. Instead of using loss of Bluetooth™ connectivity to trigger follow-me mode, Bluetooth™ proximity detection can also be used to signal availability to enter into follow-me mode. When the device is set to "discoverable" mode, the Bluetooth™-enabled device sends a signal indicating that it is ready and available to "pair" with another Bluetooth™ device. For example, if first and second mobile users are planning to meet up so that one can follow the other, the two users put their devices into "discoverable" mode in order to allow the two devices to pair up when they have come suitably within range, e.g. up to approximately 100 meters for a Class I Bluetooth™ device, or alternatively, to within 10 meters for a Class II device. In addition, some or all of the data exchanged can be accomplished using the Bluetooth™ connection (for Class I devices) although due to the limited range (100 m), it is preferable to rely on the wireless link. In another variant, the device could use the Bluetooth™ link and then switch over to the cellular channel (the "normal" wireless link) when the devices get close to their maximum range.

Furthermore, as shown by way of example in FIG. 9, the user can configure the follow-me manager to actively generate and transmit data (active mode) or to await requests for data from the device that is following (passive mode). The user of the device being followed can accept to generate bitmaps on request (which puts more burden on the device being followed) or to only send the raw data (which shifts the computational burden to the device doing the following).

As further shown in FIG. 9, the follow-me manager can enable the user to specify whether to allow generation and transmission of current position data, speed data, time data and path data. For speed data, the first mobile user can specify whether to send only the speed or the speed plus direction (velocity vector). Finally, as shown in FIG. 9 again by way of example only, the permitted frequency of updates can be regulated by the first mobile user. Frequent updates are courteous to the party being followed (i.e. providing the most tracking data) but are also most expensive in terms of data charge and airtime and use up the processing resources of the device. Infrequent transmissions, on the other hand, use up less resources, keeping the device's processor and RAM free for handling other applications. This feature regulates what the first mobile user is willing to allocate. In effect, the actual frequency of transmissions can be a function of what the first mobile user is willing to provide and what the second mobile user is requesting or it can be a function of the various parameters mentioned above, namely the rate of travel, distance between the mobile users, etc.

In another implementation, the frequency of updates can be based on a feedback loop that requires feedback from the follower. For example, instead of the first mobile device (lead user) transmitting complete sets of route data representing all the route information between their respective positions, a more efficient way of transmitting data might entail parcelling the route data and transmitting only small batches or parcels of route information at a time to the follower (second mobile user) with a waypoint marker. When the follower reaches the waypoint marker, the follower's device signals to the lead user that more data is needed. The waypoint marker can be set a certain distance (or time equivalent) ahead of the end of the current segment of route data so that the follower does not run out of route data before more can be supplied. In other words, when the follower reaches the waypoint marker, the follower device signals the lead device that the next segment of route information is needed. As a corollary benefit, the lead user receives confirmation that the follower has reached the waypoint marker and is thus "on track". This gives the lead user a more granular sense of where the follower is currently positioned, permitting the user to optionally make adjustments in course, speed, etc. to accommodate the follower. Requesting more data from the lead device can be accomplished in a manner very similar to a "more" (data) request made in respect of a received e-mail, i.e. just a single bit (flag) indicating that the waypoint has been reached and that, consequently, more data is required to describe or depict the next segment along the route.

Although the foregoing has presumed one follower and one lead device, this technology can also be used to multicast tracking data to more than one follower. This is the case where a first mobile user wishes to lead a group of friends all in different cars to his cottage.

It should also be appreciated that the follower could also be a static (non-mobile) follower, i.e. a user of a stationary computing device, who is only visually following, or visually tracking, the lead user's movements. Although the computing device is preferably a wireless communications device, the computing device can also be a desktop computer, laptop, or other such computing device that has a processor, memory and communications port for receiving the real-time tracking data. Even for a fixed computing device, the communications port can be wireless or wire-line.

This new technology has been described in terms of specific implementations and configurations which are intended to be exemplary only. The scope of the exclusive right sought by the Applicant is therefore intended to be limited solely by the appended claims.

The invention claimed is:

1. A method of tracking a first wireless communications device using a second wireless communications device, the method comprising:
   receiving user input to enable tracking of the first wireless communications device wherein the user input is received via a user interface that enables the user to manually enable tracking, to disable tracking or enable automatic triggering of tracking; and
   in response to receiving the user input, enabling the tracking of the first wireless communications device by the second wireless communications device by:
   establishing a wireless connection between the first and second wireless communications devices;
   obtaining current position data for the first wireless communications device;
   transmitting the current position data from the first wireless communications device to the second wireless communications device using the wireless connection to enable tracking of the first wireless communications device using the second wireless communications device;
   wherein transmitting the current position data comprises:
   defining waypoints for segments of a path and sending the path data in segments to the second wireless communications device; and
   receiving an indication from the second wireless communications device that the second wireless communications device has reached a waypoint and sending the path data for a successive segment to the second wireless communications device in response to receiving the indication.

2. The method as claimed in claim 1 further comprising transmitting one or more of speed data, time data and path data.

3. The method as claimed in claim 2 further comprising receiving preference data from the second wireless communications device indicating which of the speed data, time data and path data is to be transmitted by the first wireless communications device to the second wireless communications device.

4. The method as claimed in claim 2 further comprising receiving further user input to specify which of the speed data, time data and path data is to be transmitted by the first wireless communications device to the second wireless communications device.

5. A non-transitory computer-readable medium comprising code which, when loaded into memory and executed on a processor of a first wireless communications device, enables a tracking mode for sharing tracking data with a second wireless communications device by:
   receiving user input to enable tracking of the first wireless communications device by the second wireless communications device wherein the user input is received via a user interface that enables the user to manually enable tracking, to disable tracking or enable automatic triggering of tracking; and
   in response to receiving the user input, enabling the tracking of the first wireless communications device by the second wireless communications device by:
   establishing a wireless connection between the first and second wireless communications devices;
   obtaining current position data for the first wireless communications device; and transmitting the current position data from the first wireless communications device to the second wireless communications device using the wireless connection to enable tracking of the first wireless communications device using the second wireless communications device;

wherein transmitting the current position data comprises:

defining waypoints for segments of a path and sending the path data in segments to the second wireless communications device; and receiving an indication from the second wireless communications device that the second wireless communications device has reached a waypoint and sending the path data for a successive segment to the second wireless communications device in response to receiving the indication.

6. The computer-readable medium as claimed in claim 5 further comprising transmitting one or more of speed data, time data and path data.

7. The computer-readable medium as claimed in claim 6 further comprising code for receiving preference data from the second wireless communications device indicating which of the speed data, time data and path data is to be transmitted by the first wireless communications device to the second wireless communications device.

8. The computer-readable medium as claimed in claim 6 further comprising code for receiving further user input to specify which of the speed data, time data and path data is to be transmitted by the first wireless communications device to the second wireless communications device.

9. A first wireless communications device for generating and transmitting data to enable tracking of the first wireless communications device by a second wireless communications device, the first wireless communications device comprising:

a user interface for receiving user input to enable tracking wherein the user input is received via a user interface that enables the user to manually enable tracking, to disable tracking or enable automatic triggering of tracking;

a Global Satellite Navigation System (GNSS) receiver for receiving GNSS signals and for generating current position data representing a current position of the first wireless communications device;

a processor operatively connected a memory, the processor being configured to establish a wireless connection between the first and second wireless communications devices and to cause a radiofrequency transmitter to transmit the current position data of the first wireless communications device to the second wireless communications device, wherein the processor causes the transmitter to transmit the current position data by:

defining waypoints for segments of a path and sending the path data in segments to the second wireless communications device; and receiving an indication from the second wireless communications device that the second wireless communications device has reached a waypoint and sending the path data for a successive segment to the second wireless communications device in response to receiving the indication.

10. The first wireless communications device as claimed in claim 9 wherein the processor causes the radiofrequency transmitter to transmit one or more of speed data, time data and path data.

11. The first wireless communications device as claimed in claim 10 further comprising receiving preference data from the second wireless communications device indicating which of the speed data, time data and path data is to be transmitted by the first wireless communications device to the second wireless communications device.

12. The first wireless communications device as claimed in claim 10 further comprising code for receiving further user input to specify which of the speed data, time data and path data is to be transmitted by the first wireless communications device to the second wireless communications device.

* * * * *